(12) United States Patent
Wong et al.

(10) Patent No.: US 6,697,468 B2
(45) Date of Patent: *Feb. 24, 2004

(54) SYSTEM AND METHOD FOR PROVIDING CALL INFORMATION IN REAL TIME

(75) Inventors: Ping Chi Wong, Plano, TX (US); Lars Tovander, Plano, TX (US)

(73) Assignee: Ericsson Inc, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/242,345

(22) Filed: Sep. 11, 2002

(65) Prior Publication Data

US 2003/0012350 A1 Jan. 16, 2003

Related U.S. Application Data

(63) Continuation of application No. 09/436,568, filed on Nov. 9, 1999, now Pat. No. 6,483,907.

(51) Int. Cl.[7] .............................................. H04M 15/00
(52) U.S. Cl. ........................... 379/112.01; 379/112.06; 379/133; 379/114.01; 379/114.03; 379/114.28; 379/126; 379/32.05; 379/220.01
(58) Field of Search ....................... 397/112.01, 112.06, 397/114.01, 114.28, 114.29, 115.01, 118, 120, 121.01, 126, 127, 133, 210.01, 220.01, 221.01, 221.08, 221.14, 32.01, 32.02, 32.03, 32.04, 32.05; 370/351, 352, 356, 389, 390

(56) References Cited

U.S. PATENT DOCUMENTS

| 5,506,893 A | 4/1996 | Buscher et al. ............ 379/114 |
| 5,550,912 A | 8/1996 | Akinpelu et al. ........... 379/221 |
| 5,627,886 A | 5/1997 | Bowman .................... 379/111 |
| 5,809,121 A | 9/1998 | Elliott et al. ............... 379/127 |
| 5,867,566 A | 2/1999 | Hogan et al. ............... 379/115 |
| 5,930,344 A | * 7/1999 | Relyea et al. .............. 379/126 |
| 5,956,391 A | 9/1999 | Melen et al. ............... 379/114 |
| 6,104,704 A | 8/2000 | Buhler et al. ............... 370/252 |
| 6,137,876 A | 10/2000 | Wong et al. ................ 379/246 |
| 6,345,087 B1 | * 2/2002 | Batham ................... 379/32.05 |
| 6,483,907 B1 | * 11/2002 | Wong et al. ........... 379/112.01 |
| 6,515,968 B1 | * 2/2003 | Combar et al. ............ 370/252 |

FOREIGN PATENT DOCUMENTS

WO  WO 99/29090  6/1999

OTHER PUBLICATIONS

PCT; International Search Report for PCT/US00/41792; Jun. 1, 2001.

* cited by examiner

Primary Examiner—Curtis Kuntz
Assistant Examiner—Quoc D Tran

(57) ABSTRACT

A telecommunications system and method are disclosed for providing information relating to a telephone call associated with an access point within a telecommunications system, such as a telephone line or telephone number, to a software application in substantial real time. The system and method include assigning a destination address to the telecommunications system access point about which telephone call information is desired, and sending an electronic message to the destination address in response to a telephone call being established utilizing the access point. The electronic message includes, among other things, information relating to the telephone call and the access point. Within the context of a telecommunications switch for controlling traffic associated with a plurality of telephone lines, when the switch receives a telephone message, such as a setup message or backward message, having a destination address therein, the switch sends an electronic message to the destination address upon receipt of the telephone message. The electronic message includes information identifying the telephone message, and the switch. In this way, information relating to the usage of a telecommunications access point may be provided in real time for billing or tracing purposes.

18 Claims, 5 Drawing Sheets

SYSTEM AND METHOD FOR PROVIDING CALL INFORMATION IN REAL TIME

This is a continuation of application Ser. No. 09/436,568 filed Nov. 9, 1999 now U.S. Pat. No. 6,483,907.

BACKGROUND OF THE INVENTION

1. Technical Field of the Invention

The present invention relates to providing telephone call information, and particularly to a system and method for providing information relating to a telephone line or other access point in a telecommunications network in real time.

2. Background of the Invention

Modern telecommunications systems are capable of providing a wealth of information relating to the use of a telephone line. In some circumstances, it is beneficial to obtain information relating to a telephone call utilizing a preselected telephone line during and/or immediately following the telephone call. For example, businesses such as hotels would benefit from being made aware of the usage of their hotel room telephones in substantially real time so that hotel patrons may be suitably billed. In addition, law enforcement or emergency 911 service providers would benefit from having telephone call information in substantially real time so that telephone calls can be accurately traced. As a result, there is a need for effectively providing telephone information in substantially real time.

SUMMARY OF THE INVENTION

The present invention satisfies a significant need for a telecommunications system and method for providing, in substantially real time, telephone call information relating to preselected telephone lines. A preferred embodiment of the present invention is directed to software and corresponding hardware within a telecommunications system. The software allows for a preselected telephone line or other access point within the telecommunications system to be assigned a destination address, such as an IP address or URL address. Thereafter, when a telephone call involves or otherwise utilizes the preselected telephone line and/or access point, the switch automatically sends a message to the assigned destination address. The message, an IP-based message, a URL message or other electronic message, includes information relating to the telephone call, such as the CDR sequence number, the called telephone number or the calling telephone number, a time stamp relating to the telephone call, or the switch. Additional messages may be sent to the destination address upon the occurrence of events that change the state of the telephone call, such as the telephone call terminating or being suspended.

One preferred embodiment of the present invention is within the context of a hotel or other business wherein telephone call information relating to at least one preselected telephone line is provided in substantially real time in order for the business to be capable of billing a customer for a telephone call during or soon after the call. The embodiment may further include a computer to which the messages are directed, and billing application software associated with the computer. The computer and billing application software are capable of receiving the messages and generating billing information based upon the telephone call associated with the messages. In this way, a business is capable of monitoring and generating billing information relating to use of a preselected telephone line in substantially real time.

A second preferred embodiment of the present invention is directed towards providing a call tracing feature for a telecommunications system. Specifically, system software allows a telephone line or other access point to a telecommunications switch to be assigned a destination address and, sends a message to the assigned destination address in response to an outgoing telephone call being placed from the access point or an incoming telephone call being received thereat. The message includes telephone call information relating to the telephone call, such as the called or calling telephone number, the CDR sequence number, and a time stamp relating to the telephone call.

In addition, for an outgoing telephone call placed from the access point having the assigned destination address, the assigned destination address is included in a setup message of the outgoing telephone call, such as the initial address message (IAM) or SETUP. Then, for each additional switching device or other node through which the outgoing telephone call is routed, the system software sends a message to the assigned destination address as the outgoing telephone call setup message is routed or forwarded through the switching device. The message may include information identifying the outgoing telephone call and the switching device or node through which the outgoing telephone call is routed/forwarded. In this way, information relating to each node or switching device is provided to the assigned destination address in substantially real time.

For an incoming telephone call received at the access point to which a destination address is assigned, the system software includes the destination address in the first backward message of the incoming telephone call. Then, for each additional switching device or other node through which the incoming telephone call is routed or forwarded, a message is sent to the assigned destination address as the backward message is routed through the switching device. In this way, a law enforcement agency or other entity may trace incoming and outgoing telephone calls utilizing a preselected access point at each node within the telecommunications system in substantially real time.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE PREFERRED EXEMPLARY EMBODIMENTS

The present invention will now be described more fully hereinafter with reference to the accompanying drawings in which a preferred embodiment of the invention is shown. This invention may, however, be embodied in many different forms and should not be construed as being limited to the embodiment set forth herein. Rather, the embodiment is provided so that this disclosure will be thorough and complete, and will fully convey the scope of the invention to those skilled in the art.

Figure 1:
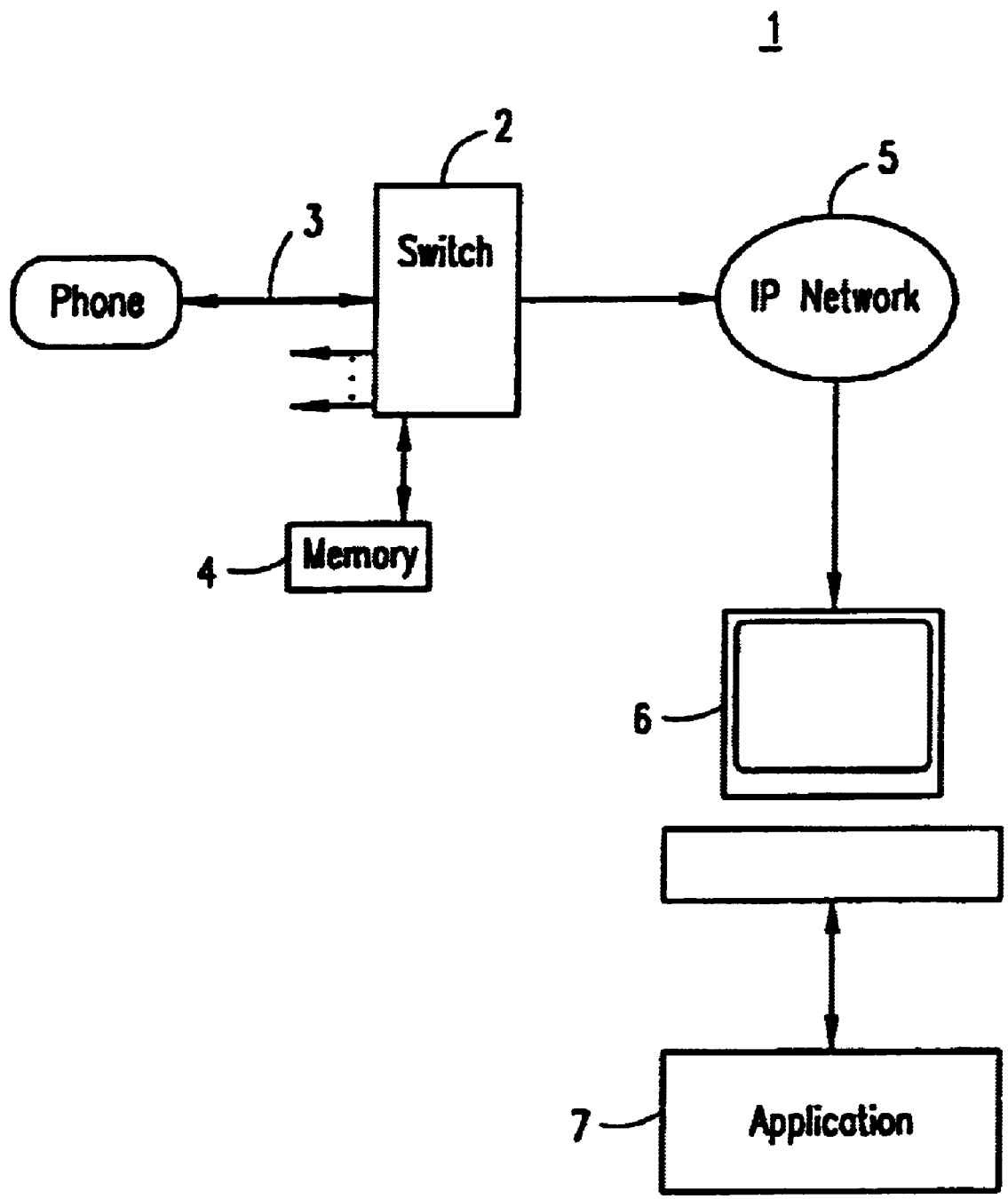
FIG. 1 is a block diagram of a telecommunications system according to a first preferred embodiment of the present invention.
Figure 3:
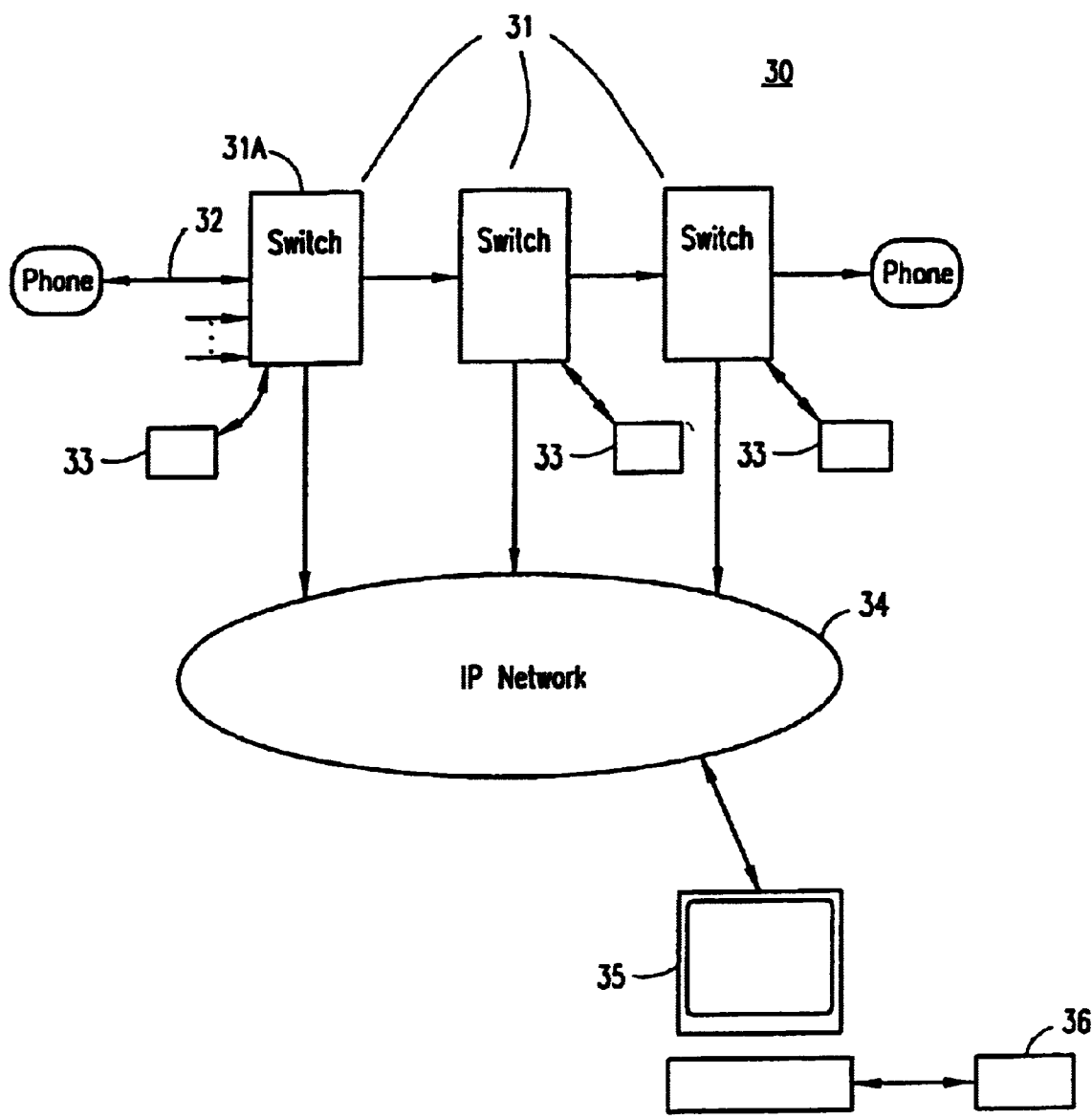
FIG. 3 is a block diagram of a telecommunications system according to a second preferred embodiment of the present invention.

Referring to FIGS. 1 and 3, there is shown a telecommunications system of the present invention. The telecommunications system is adapted to provide telephone call information involving a telephone line or other access point within a telecommunications system substantially during the course of the telephone call. The telecommunications system thereby allows for effectively billing for telephone usage and tracing telephone calls relating to a preselected telephone line in substantially real time.

FIG. 1 illustrates a telecommunications system 1 according to a first preferred embodiment of the present invention. Telecommunications system 1 includes a switching device 2 which controls traffic associated with a plurality of telephone lines, including telephone line 3. Switching device 2 may, for example, be an exchange, such as a PBX. Alternatively, telecommunications system 1 may be a portion of a mobile cellular telecommunications system in which switching device 2 is an MSC which controls wireless communication to a mobile telephone over the radio interface.

Telecommunications system 1 includes system software associated with switching device 2, such as software stored in memory 4 utilized by switching device 2, which controls switching device 2 to provide telephone call information in substantially real time. First, the system software allows for a destination address to be selectively assigned to a preselected access point associated with switching device 2, such as a particular telephone line 3 to which switching device 2 provides telecommunication services. The system software additionally causes switching device 2 to send a message, such as an electronic message, to the assigned destination address whenever a telephone call utilizes the preselected access point 3. In this case, switching device 2 sends a message to the assigned destination address whenever an incoming telephone call is initially directed towards the preselected access point 3 or an outgoing telephone call initially enters the telecommunications system 1 over the preselected access point 3. It is understood, however, that switching device 2 may send a message only when an outgoing telephone call initially enters the telecommunications system 1 over the preselected access point 3. The message is transported over network 5 from switching device 2 to the device associated with the assigned destination address.

It is understood that the transport of messages to the destination address may utilize any of a number of technologies. For instance, message transport by switching device 2 may be IP-based, wherein the message is an IP-based message that is transported over IP-based network 5 to an IP address utilizing a TCP/IP protocol. Alternatively, message transport by switching device 2 may be URL-based, wherein a URL message is sent over a network 5 to a URL address. The preferred embodiments will be described below within the context of IP-based message transport for exemplary purposes only.

The IP message generated and transmitted by switching device 2 includes information relating to the telephone call that initiated the generation of the IP message. The information may include information suitable for sufficiently billing for telephone usage through access point 3 or otherwise logging telephone call activity of access point 3. For instance, the IP message may include an identification of the called party and/or calling party, the CDR sequence number, or a time stamp corresponding to the establishment of the telephone call. In this way, a business entity, such as a business activity that charges a fee for telephone usage through access point 3, is provided telephone usage information corresponding to access point 3 in substantially real time.

As stated above, system software of switching device 2 generates and transmits an IP message to the assigned IP address upon the establishment of a telephone call utilizing access point 3. In order to provide telephone usage information relating to access point 3 so that a user of access point 3 is sufficiently and accurately charged for telephone usage thereof, the system software of switching device 2 preferably sends an additional IP message to the assigned IP address whenever an event occurs that may effect the billing for telephone usage through access point 3. The event may be any event that changes the state of the telephone call, such as termination of the telephone call, suspension of the telephone call, or resumption of the telephone call following suspension thereof. Consequently, a business entity or other billing service may receive information for sufficiently billing for telephone usage corresponding to access point 3.

The first preferred embodiment of the present invention may further include a computing device 6 having the assigned IP address corresponding thereto. Computing device 6 may, for instance, be a computer on which billing information is generated for telephone service usage of access point 3. Computing device 6 preferably includes a computer application 7 which extracts telephone call information from IP messages received by computing device 6 and determines billing information corresponding to telephone usage through access point 3.

For each telephone call utilizing access point 3, computer application 7 extracts information from received IP messages relating to the telephone call and computes, among other things, the duration of the telephone call. Computer application 7 may also determine the type of telephone call based upon the extracted information, in the event the type of telephone call effects the billing therefor. The billing information may be presented, for example, as an itemized list of telephone calls relating to access point 3. Each entry in the presented list of telephone calls may include the date, time and time duration of the telephone call, the charge for the telephone call and the telephone number of the other party that participated in the telephone call.

Figure 2:
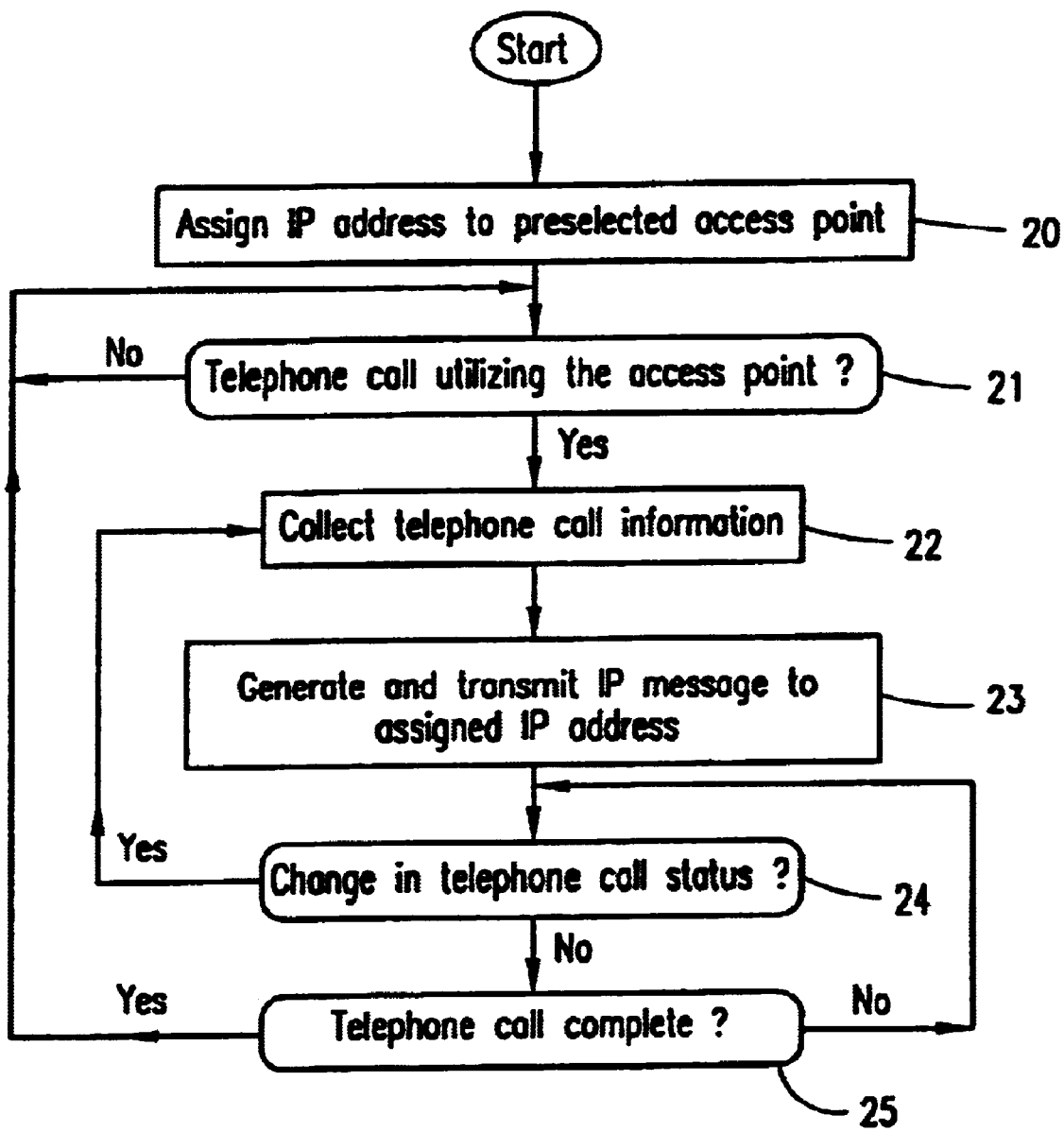
FIG. 2 is a flow chart illustrating an operation of the telecommunications system shown in FIG. 1.

The operation of telecommunications system 1 according to the first preferred embodiment of the present invention will be described with reference to FIG. 2. At step 20, an IP address is assigned to a preselected access point 3 associated with switching device 2. In this case, the IP address is the IP address of computing device 6. Upon detection of the establishment of a telephone call that utilizes access point 3 at step 21, information relating to the telephone call is collected by switching device 2 at step 22. The telephone call information may include the CDR sequence number, the telephone numbers of both of the called party and the calling party, a time stamp of the establishment of the telephone call, and the state of the telephone call (active, suspended, etc.). Next, the system software causes switching device 2 to generate and send an IP message to the assigned IP address at step 23. Upon detection of a change in the state of the telephone call at step 24, steps 22 and 23 are repeated so as that updated information relating to the telephone call is sent to the IP address. Upon detection of the termination of the telephone call at step 25, switching device 2 waits for the establishment of a next telephone call utilizing preselected access point 3. Once all of the IP messages for the telephone call have been sent to computing device 6, computer application 7 extracts the telephone call information from the IP messages for the telephone call, computes billing information for the telephone call and organizes the billing information for the telephone call and other telephone calls utilizing access point 3 for subsequent presentation.

The present invention may also be directed towards providing a call tracing function for use by, for example, law enforcement personnel or emergency 911 service providers. In a second preferred embodiment of the present invention, telecommunications system 30 (FIG. 3) is adapted to provide comprehensive information relating to a telephone call so that the telephone call may be accurately traced throughout telecommunications system 30 between the two or more parties participating in the telephone call.

Telecommunications system 30 includes a plurality of switching devices 31 which control traffic associated with a plurality of telephone lines, including telephone line 32. Switching devices 31 may, for example, be an exchange, such as a PBX. Alternatively, telecommunications system 30 may be a portion of a mobile cellular telecommunications system in which switching device 31 is an MSC which controls wireless communication to a mobile telephone over the radio interface.

Telecommunications system 30 includes system software associated with switching devices 31, such as software stored in memory devices 33 utilized by switching devices 31, which controls switching devices 31 to provide telephone call tracing information in substantially real time. The system software allows for an IP address to be selectively assigned to a preselected access point 32 associated within a switching device 31. Similar to the first preferred embodiment of the present invention described above, the system software additionally causes the switching device 31A associated with the preselected access point 32 to send an IP-based message to the assigned IP address whenever a telephone call utilizes the preselected access point 32. In this case, switching device 31A sends an IP message to the assigned IP address whenever an incoming telephone call is initially directed towards the preselected access point 32 or an outgoing telephone call initially enters the telecommunications system 30 over the preselected access point 32. It is understood, however, that switching device 31A may send an IP message only when an outgoing telephone call initially enters the telecommunications system 30 over the preselected access point 32. The IP message is transported over IP network 34 from switching device 31A to the device associated with the assigned IP address.

Like in the first preferred embodiment described above, the IP message generated and transmitted by switching device 31A includes information relating to the telephone call that initiated the generation of the IP message. The information may include information suitable for sufficiently logging telephone call activity of access point 32. For instance, the IP message may include an identification of the called party and/or calling party, the CDR sequence number, or a time stamp corresponding to the establishment of the telephone call. In this way, an entity is provided with telephone usage information corresponding to access point 32 in substantially real time.

In providing a telephone call tracing feature, it is beneficial to provide detailed information relating to a telephone call so that all of the participating parties to the telephone call may be most accurately identified.

Accordingly, the system software preferably also causes switching device 31A, the switching device associated with preselected access point 32, to place the assigned IP address in a telephone message of each telephone call involving access point 32. For an outgoing telephone call from access point 32, switching device 31A places the IP address in an outgoing message, such as in the SETUP or IAM message. For an incoming telephone call to access point 32, switching device 31A places the IP address in the first backward message, such as the address complete message (ACM) or the call progress message (CPG). In this way, for each telephone call involving access point 32, a telephone message is sent from switching device 31A to other nodes in telecommunications system 30 indicating that a call tracing feature is to be invoked to send information relating to the telephone call to the IP address.

According to the second preferred embodiment of the present invention, system software is included in each memory device 33 corresponding to other switching devices, node and/or exchanges 31 in telecommunications system 30. The system software causes each switching device 31 through which a telephone call involving preselected access point 32 to detect that a telephone message (outgoing message or backward message) includes an IP address and to send in response telephone call tracing information to the assigned IP address when the telephone call is passed through the switching device 31. The telephone call information may include an identification of the particular switching device 31, a time stamp of the time the telephone call passes through switching device 31, and an identification of the telephone call (CDR sequence number). With each switching device 31 sending an IP message to the IP address having information relating to the telephone call, a telephone call may be substantially accurately monitored within telecommunications system 30.

The system software within memory devices 33 of each switching device or node 31 also causes telephone call tracing information to be generated in the event a telephone call involving preselected access point 32 is forwarded to another location within telecommunications system 30. Specifically, if a telephone call involving preselected access point 32 is forwarded to a new location, the assigned IP message is included in a message (outgoing forward or backward) directed towards the new location. Each switching device 31 handling the forwarded telephone call, including the switching device 31 associated with the new location, is caused to detect the IP message in the message and to send an IP message to the IP address having telephone call tracing information therein. This allows a telephone call involving preselected access point 32 to be accurately traced in the event the telephone call is forwarded.

Telecommunications system 30 may further include a computing device 35 having the assigned IP address corresponding thereto. Computing device 35 may, for instance, be a computer on which is provided the status of a telephone call involving preselected access point 32. Computing device 35 preferably includes a computer application 36 which extracts telephone call information from IP messages received by computing device 35 and presents information relating to telephone usage through access point 32 in substantially real time. The presentation of telephone call tracing information may be in virtually any suitable format for monitoring call tracing information.

Figure 4:
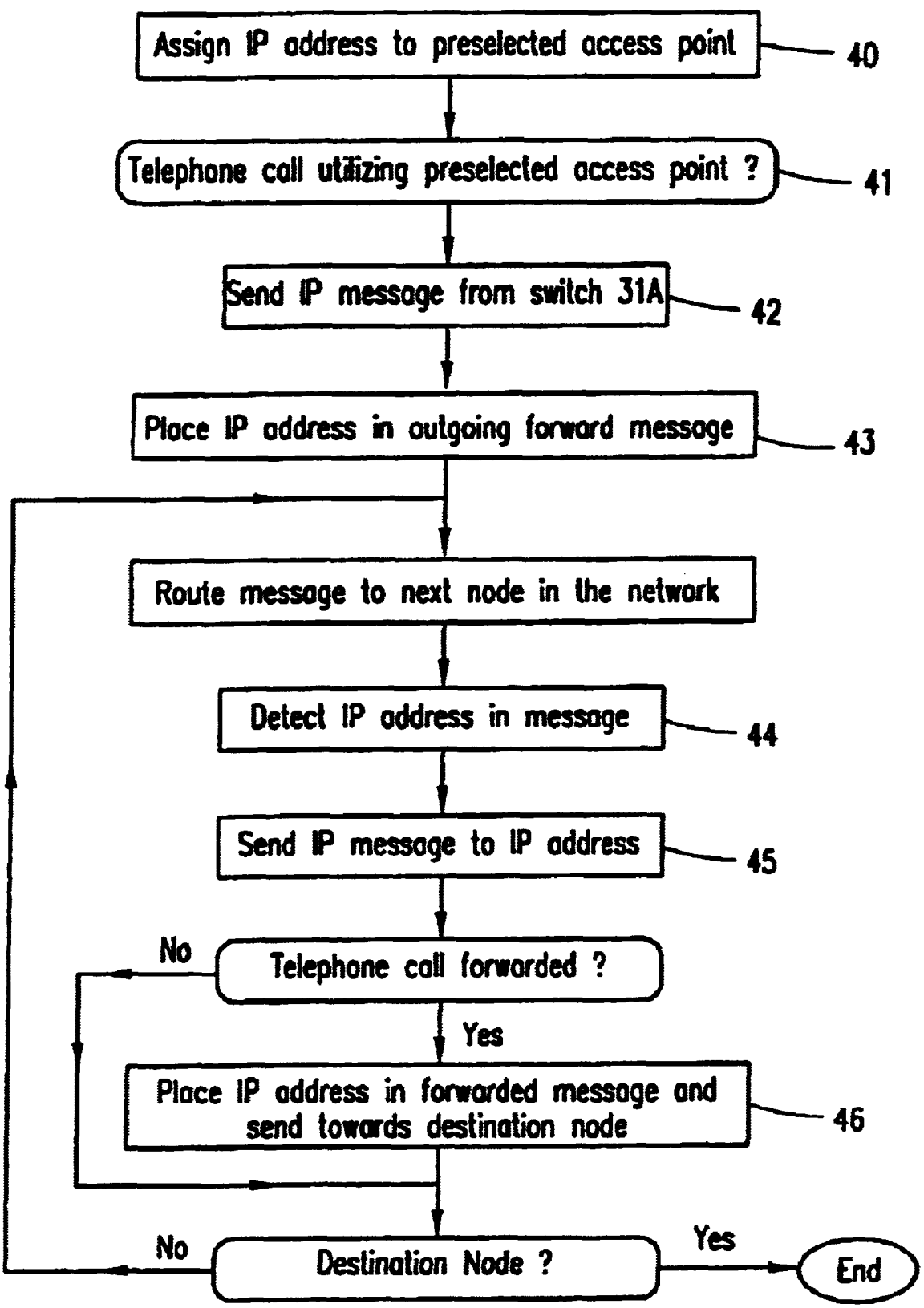
FIG. 4 is a flow chart illustrating an operation of the telecommunications system shown in FIG. 3.
Figure 5:
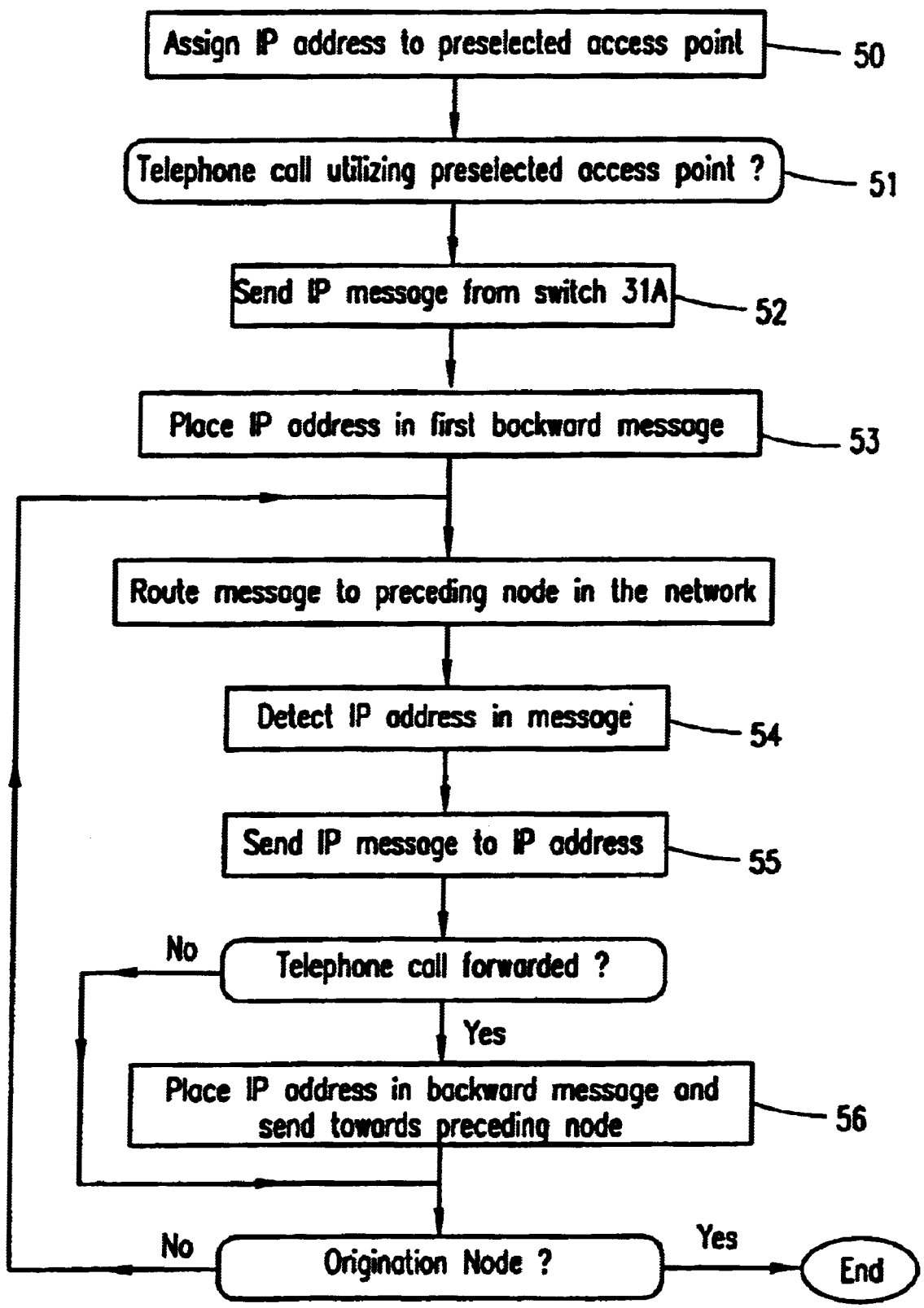
FIG. 5 is a flow chart illustrating an operation of the telecommunications system shown in FIG. 3

The operation of telecommunications system 30 according to a second preferred embodiment of the present invention will be described with reference to FIG. 4 in handling an outgoing telephone call originating from access point 32. Initially, an IP address is assigned at step 40 to an access point 32 within telecommunications system 30 from which telephone calls are to be traced. If an outgoing telephone call involving access point 32 is detected at step 41, an IP message is sent to the IP address at step 42 from switching device 31A having telephone call tracing information therein. Switching device 31 includes the assigned IP address in a forward or outgoing message at step 43.

Next, as the telephone call message (having the IP address therein) is routed through switching devices 31 en route to its intended destination, each switching device 31 handling the telephone call message detects the IP address in the telephone message at step 44, and sends an IP message at step 45 to the assigned IP address in response thereto. Steps 44 and 45 are performed by each switching device 31 routing the telephone call message, until the telephone call message reaches the intended destination.

In the event the telephone call is forwarded, the forwarding switching device 31 includes the assigned IP address in the corresponding forward/backward message at step 46. Steps 44 and 45 are performed by each forwarding switching device 31 until the forwarded telephone call message reaches the intended destination.

The operation of telecommunications system 30 according to a second preferred embodiment of the present invention will be described with reference to FIG. 4 in handling an incoming telephone call destined for access point 32. Initially, an IP address is assigned at step 50 to an access point 32 within telecommunications system 30 from which telephone calls are to be traced. If an incoming telephone call involving access point 32 is detected at step 51, an IP message is sent to the IP address at step 52 from switching device 31A having telephone call tracing information therein. Switching device 31 includes the assigned IP address in the first backward message at step 53.

Next, as the telephone call backward message (having the IP address therein) is routed through switching devices 31 en route to its intended destination from where the telephone call originated (the origination node), each switching device 31 handling the telephone call message detects the IP address in the telephone message at step 54, and sends an IP message at step 55 to the assigned IP address in response thereto. Steps 54 and 55 are performed by each switching device 31 routing the telephone call message, until the telephone call message reaches the intended destination where the telephone call originated (the origination node).

In the event the telephone call is forwarded, the forwarding switching device 31 includes the assigned IP address in the corresponding forward/backward message at step 56. Steps 54 and 55 are performed by each forwarding switching device 31 until the forwarded telephone call message reaches the intended destination.

It is understood that the preferred embodiments of the present invention are capable of providing telephone call information relating to a number of access points within a telecommunications system. The preferred embodiments are described above as providing telephone call information relating to a single access point for exemplary purposes only.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of providing call connection information to a device identified by a destination address, comprising the steps of:
   providing the destination address to a telecommunications point in a telecommunications network;
   establishing an outgoing call connection from a telephone device associated with the telecommunications point;
   including the destination address in an outgoing message of the outgoing call connection; and
   for each node in the telecommunications network the outgoing message passes through, sending an electronic message from the node to the device identified by the destination address provided to the telecommunications point as the outgoing message is passed through the node, the electronic message including information relating to the call connection and the node.

2. The method of claim 1, wherein:
   the information includes the CDR sequence number of the call connection.

3. The method of claim 1, wherein:
   the information includes at least one of the called telephone number and the calling telephone number.

4. The method of claim 1, wherein:
   the information includes a time stamp corresponding to the establishment of the call connection.

5. The method of claim 1, further comprising the step of:
   in response to a change in the status of the call connection, sending an electronic message regarding the change to the device identified by the destination address provided to the telecommunications point.

6. The method of claim 5, wherein:
   the change in status of the call connection comprises a termination of the call connection.

7. The method of claim 5, wherein:
   the change in status of the call connection comprises the suspension of the call connection.

8. The method of claim 1, further comprising the step of:
   generating billing information based upon the information.

9. The method of claim 1, wherein the electronic messages sent by the nodes are IP-based messages or URL-based messages.

10. A method of providing call connection information to a device identified by a destination address, comprising the steps of:
    providing the destination address to a telecommunications point in a telecommunications network;
    sending a backward message in response to receiving information corresponding to an incoming call connection, the backward message including the destination address provided to the telecommunications point; and
    for each node the backward message passes through, sending an electronic message from the node to the device identified by the destination address provided to the telecommunications point as the backward message is passed through the node, the electronic message including information relating to the call connection and the node.

11. The method of claim 10, wherein:
    the information relating to the call connection and the node includes the CDR sequence number of the call connection.

12. The method of claim 10, wherein:
    the information relating to the call connection and the node includes a time stamp corresponding to the establishment of the call connection.

13. The method of claim 10, further comprising the step of:
    in response to a change in the status of the call connection, sending an electronic message regarding the change to the device identified by the destination address provided to the telecommunications point.

14. The method of claim 13, wherein:

the change in status of the call connection comprises a termination of the call connection.

15. The method of claim 13, wherein:

the change in status of the call connection comprises the suspension of the call connection.

16. The method of claim 10, further comprising the step of:

generating billing information based upon the information.

17. The method of claim 10, wherein the electronic messages sent by the nodes are IP-based messages or URL-based messages.

18. A method of providing call connection information to an apparatus identified by a destination address, comprising the steps of:

providing the destination address to a telecommunications point in a telecommunications network;

upon an outgoing call connection being established utilizing the telecommunications point, sending a first electronic message to the apparatus identified by the destination address provided to the telecommunications point, the first electronic message having call connection information of the established call connection; and for each node in the telecommunications network, the outgoing call connection is subsequently forwarded through, sending an electronic message from the node to the apparatus identified by the destination address provided to the telecommunications point as the outgoing call connection is forwarded through the node, the electronic message including information relating to the call connection and the node.

* * * * *